United States Patent
Kawamura et al.

[11] 4,130,339
[45] Dec. 19, 1978

[54] SCANNING OPTICAL SYSTEM INCLUDING OPTICAL SYSTEM FOR DETECTING AN INFORMATION BEAM

[75] Inventors: Naoto Kawamura, Inagi; Kazuya Matsumoto; Takashi Kitamura, both of Yokohama, all of Japan

[73] Assignee: Canon Kabushiki Kaisha, Tokyo, Japan

[21] Appl. No.: 776,894

[22] Filed: Mar. 11, 1977

[30] Foreign Application Priority Data

Mar. 16, 1976 [JP] Japan .................. 51-28494
Mar. 19, 1976 [JP] Japan .................. 51-30492

[51] Int. Cl.² ............................. G02B 27/17
[52] U.S. Cl. ........................ 350/6.8; 350/285; 358/199
[58] Field of Search .......... 350/6, 7, 285, 319, 350/160 R, 171, 61, 6.91, 6.6; 358/199, 208, 225; 331/94.5 K; 356/106S; 250/347; 354/199, 224

[56] References Cited

U.S. PATENT DOCUMENTS

| | | | |
|---|---|---|---|
| 3,501,223 | 3/1970 | Rack | 350/171 |
| 3,531,183 | 10/1967 | Aagard | 350/160 R |
| 3,614,205 | 10/1971 | Whitman | 350/171 |
| 3,733,979 | 5/1973 | England | 350/6 |
| 3,848,087 | 11/1974 | Carrel | 350/7 |
| 3,881,802 | 5/1975 | Helava | 350/6 |
| 3,907,197 | 9/1975 | Pöschl et al. | 350/6 |
| 4,002,830 | 1/1977 | Brown et al. | 350/7 |

Primary Examiner—John K. Corbin
Assistant Examiner—B. W. de los Reyes
Attorney, Agent, or Firm—Fitzpatrick, Cella, Harper & Scinto

[57] ABSTRACT

The disclosure describes a scanning optical system in which the scanning beam from a light source is deflected by a beam deflecting device to scan the scanning plane through a scanning beam focusing lens. The scanning optical system comprises a member disposed between the beam deflecting device and the focusing lens for reflecting a part of the scanning beam a plurality of times within the member so as to take up part of the beam as an information beam.

11 Claims, 20 Drawing Figures

SCANNING OPTICAL SYSTEM INCLUDING AN OPTICAL SYSTEM FOR DETECTING AN INFORMATION BEAM

BACKGROUND OF THE INVENTION

The present invention relates to a scanning optical system having an optical system for detecting an information beam.

For the scanning optical system in which the scanning beam is deflected by a rotary polygonal mirror, oscillating mirror or the like to scan the scanning plane, it has been known in the art to take up a part of the scanning beam as an information beam and to detect various information from the beam.

For example, such information beam is used for timing the commencement of scanning. When the beam deflecting device is a polygonal mirror that is not so good in accuracy of dividing the polygonal surfaces, there arises difficulties regarding timing the commencement of scanning i.e. synchronizing the time at which every scanning line should commence indicating or recording image on the scanning plane. One of the difficulties is known as so-called "jitter". When signal is carried by the scanning beam deflected by such a polygonal mirror having inaccurately finished polygonal surfaces, the position at which every scanning line carries out writing or reading of signal is displaced relative to the direction of scanning variously with every scanning line according as the angular error in the associated surface of the polygon. This distortional phenomenon is called "jitter". This problem of "jitter" becomes important when high accuracy in indicating or writing an image is required. It is possible to prevent the "jitter" to some extent by eliminating the angular errors in the polygonal surfaces. However, the manufacture of polygonal mirrors having high accuracy is very difficult. In particular this is true for the manufacture of polygonal mirrors having a great number of polygonal surfaces. For this reason, instead of increasing the accuracy in finishing the polygonal surfaces, an information beam is taken up from the scanning beam and used for timing the scanning as described above. Also, such information beam is useful to detect whether the scanning beam from the light source is properly oscillating or whether the beam deflecting device such as a rotary polygone mirror is operating correctly at a predetermined speed. Furthermore, by measuring the light value of the information beam, the luminance of the light source can be detected. The information obtained from such detection of the information beam is fed back to continuously adjust the operation of scanning to its normal state.

Figure 1:
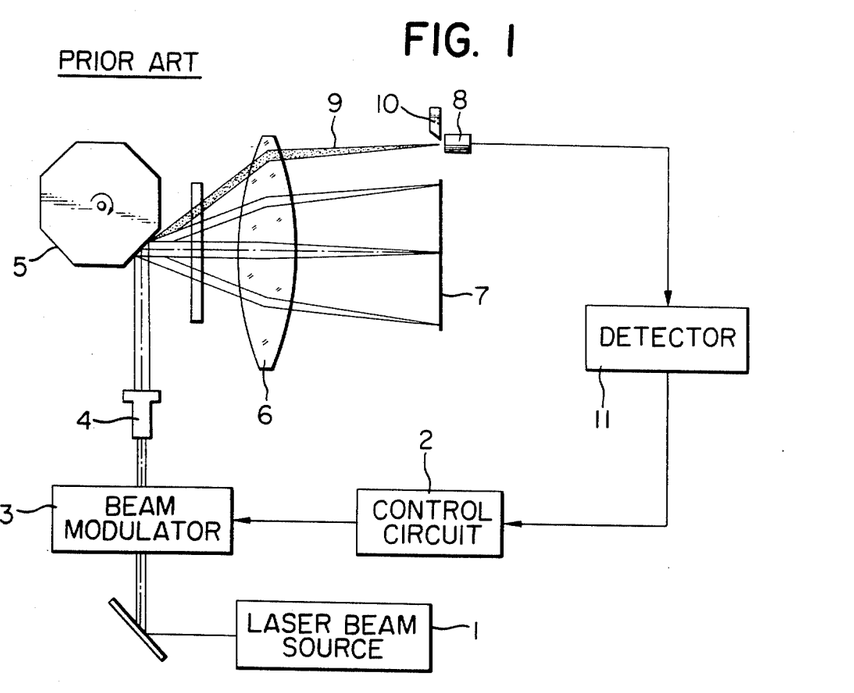
FIG. 1 is a plan view of the conventional optical system for detecting an information beam.

A typical example of the optical system hitherto known and used for taking up such an information beam is illustrated in FIG. 1. The optical system shown in FIG. 1 is an information beam taking-up optical system by which an information beam for synchronizing signal as mentioned above is taken up. The information beam is taken up from the light deflected by a beam deflecting device and passed through a scanning focusing lens, but from a portion of the light other than the effective beam portion of the same. Herein the term "effective beam" is defined as the light beam that is used to scan that area of the scanning plane the scanning of which is absolutely necessary (hereinafter said area is referred as "essential scanning area").

Now referring to FIG. 1, reference numeral 1 designates a laser beam source. The beam emitted from the beam source is introduced into a beam modulator 3 which modulates the beam in accordance with the signal coming from a control circuit 2. The modulated beam is directed to a beam expander 4 where the diameter of the beam is enlarged. Now the expanded beam is inpinged upon a rotary polygonal mirror 5. The polygonal mirror 5 deflects the beam to a focusing lens 6 which focuses the beam on a scanning plane 7 that is an indicating (displaying) surface or a recording surface. Reference numeral 8 designates a light receiving element (or photo element). The light receiving element is arranged in such manner that at every scanning, the scanning image from the rotary polygonal mirror 5 has been received by the element 8 before the image reaches the recording surface 7.

To obtain the necessary synchronizing signal, a part of the reflected beam from the polygonal mirror 5 is received by the light receiving element 8 as an information beam 9 after it is passed through the focusing lens 6 and a knife edge 10.

When the beam is received by the light receiving element 8, its excitation is detected by a detector 11 so as to actuate a timer circuit. After a predetermined time duration, the control circuit 2 starts operating so that signals in the amount corresponding to that of one scanning are successively sent into the beam modulator 3. This timing operation is repeated for every surface of the polygonal mirror 5. This enables correction of the adverse effect on scanning caused by the lack of uniformity of divided surfaces on the polygon and, therefore, the desired image indication or recording without "jitter" and having well aligned fronts is attainable.

However the information beam take-up system as illustrated in FIG. 1 and described above has some important drawbacks.

Among others, it necessitates a large angle of field for the focusing lens 6. This is because the information beam must be passed through the focusing lens and taken up from a portion of the light beam other than the effective beam. To form a large angle of field, a focusing lens having a large diameter and also a large sized polygonal mirror 5 should be used. This is disadvantageous in view of the cost and difficulty in manufacture, and also forms an obstacle to making the apparatus more compact.

There is a case where the focusing lens 6 should be a lens having a small angle of field and a short focal length. For such a case, the conventional system described above is very inconvenient. For example, this may apply to the case where writing or indication should be carried out on a scanning plane having a very small scanning width such as a micro-film with a scanning beam having high resolving power. For the radius $\psi$ of the spot diameter of a scanning beam pencil on the scanning plane, the following equation is given:

$$\psi = 1.22 \times (\lambda/\sin \beta)$$

wherein, $\lambda$ is the wave length of the scanning beam and
$\beta$ is the convergent angle of the scanning beam focused the scanning plane.

Provided that $\lambda$ is constant, the use of a focusing lens having a shorter focal length will result in a larger value of $\sin \beta$ and, therefore, a smaller value of $\psi$. In other words, by using a focusing lens having a shorter focal length, a scanning beam having a higher resolving power and a smaller spot diameter is obtained. Also, it is known that a focusing lens having a focal length of f focuses a beam with a field angle of $\theta$ on the scanning plane at the position, $y = f \cdot \theta$ wherein y is the height of image measured from the optical axis of the focusing lens taken as origin. Now, provided that the number of resolution points required per scanning line is N and the maximum angle of field of the focusing lens is $\theta_{max}$ (one side), angle per point i.e. resolution angle will be represented by $2 \cdot f \cdot \theta_{max}/N$. Accordingly, the following equation is given:

$$l = 2 \cdot f \cdot \theta_{max}/N$$

wherein l is the size on the image surface per point. Therefore it will be understood that the smaller the focal length f or the maximum angle of field $\theta_{max}$ is, the less value of l is given. This means that because of the smaller value of the image size per point (l), a more strict accuracy in positioning is required for mounting the light receiving element. For example, vibrational displacement of the element including the knife edge in the scanning direction even in the order of $1\mu \sim 0.1\mu$ is not permissible for the scanning of micro-film described above.

Furthermore, when the focal length of focusing lens is small, the focusing intensity of the focal point becomes necessarily small. For this reason, a strict accuracy in positioning in the direction of scanning beam propagation is also required for mounting the knife edge. Usually the length of the light receiving element at its light receiving portion is in the order of 0.5 mm or more, which is extremely larger than the diameter of the scanning beam. Therefore, there may be caused synchronization error by any change in output due to the ununiformity of the light receiving part.

SUMMARY OF THE INVENTION

The primary object of the present invention is to provide an improved scanning optical system which allows to take up the necessary information beam very effectivelly.

Another object of the present invention is to provide an improved scanning optical system comprising a member for taking up the information beam, disposed between the beam deflecting device and the focusing lens, which allows to keep the angular relations between the incident beam and the exit beam constant all the time even when there occurs any unintentional vibration and which enables to make the whole apparatus compact.

A further object of the present invention is to provide a scanning optical system of the above described type which permits a relatively moderate allowance in positioning for mounting the light receiving element including the related knife edge.

The information beam take-up member according to the invention is arranged and constructed in such manner that the beam is reflected at least twice within in the member. The information beam take-up member can be classified in the following three types:

Type 1. The direction of the exit beam from the member is the same as that of the incident beam to it.
Type 2. The direction of the exit beam from the member is opposite to that of the incident beam to it.
Type 3. The exit beam is directed to the desired direction in the plane containing the incident beam or a plane parallel with said plane relative to the direction of the incident beam.

More particularly, the first type of the information beam taking-up member is an optical member comprising two reflecting surfaces disposed parallel with each other. The member is so arranged that within it the information beam is reflected an even number of times. By doing so, the coincidence in direction between the incident and exit beam is maintained all the time even if the member is accidentally vibrated.

The second type of information beam take-up member comprises a corner cube or a combination of the corner cube and the above described optical member having two parallel reflecting surfaces. Even when the information beam take-up member is accidentally vibrated, the exit direction of the information beam is maintained in the direction opposite to that of the incident beam.

The third type of information beam take-up member comprises a reflection system consisting of two surfaces which normal to the plane containing the incident information beam but not parallel to each other. The information beam is thrown out from the member through the reflection system at least once and reflected an even number of times within the member before the information beam leaves it. Generally the beam deflecting device is enclosed by a casing such as polygon box to protect the apparatus against being damaged when the deflecting device is broken. The casing has a light transmissive glass portion. According to the one aspect of the invention, this glass portion also can be used as the information beam taking-up member.

Further, according to another aspect of the invention, an additional focusing lens other than the scanning focusing lens is provided for the information beam so that it may be freed from the influence of the characteristics of the scanning focusing lens. This is very advantageous when a high accuracy is required for positioning and mounting the light receiving element including the knife edge. By using an information beam focusing lens the focal length of which is longer than that of the scanning beam focusing lens, the strict allowance of accuracy for positioning and mounting the element can be moderated.

Other and further objects, features and advantages of the invention will be apparent from the following description taken in connection with the accompanying drawing.

BRIEF DESCRIPTION OF DRAWINGS

FIG. 2 shows one embodiment of the scanning optical system according to the invention, wherein FIG. 2A is a perspective view thereof and FIG. 2B is a plan view of the same;

FIG. 10 shows one embodiment of the invention using the third type of information beam taking-up member, wherein

DESCRIPTION OF THE PREFERRED EMBODIMENTS

Figure 2:
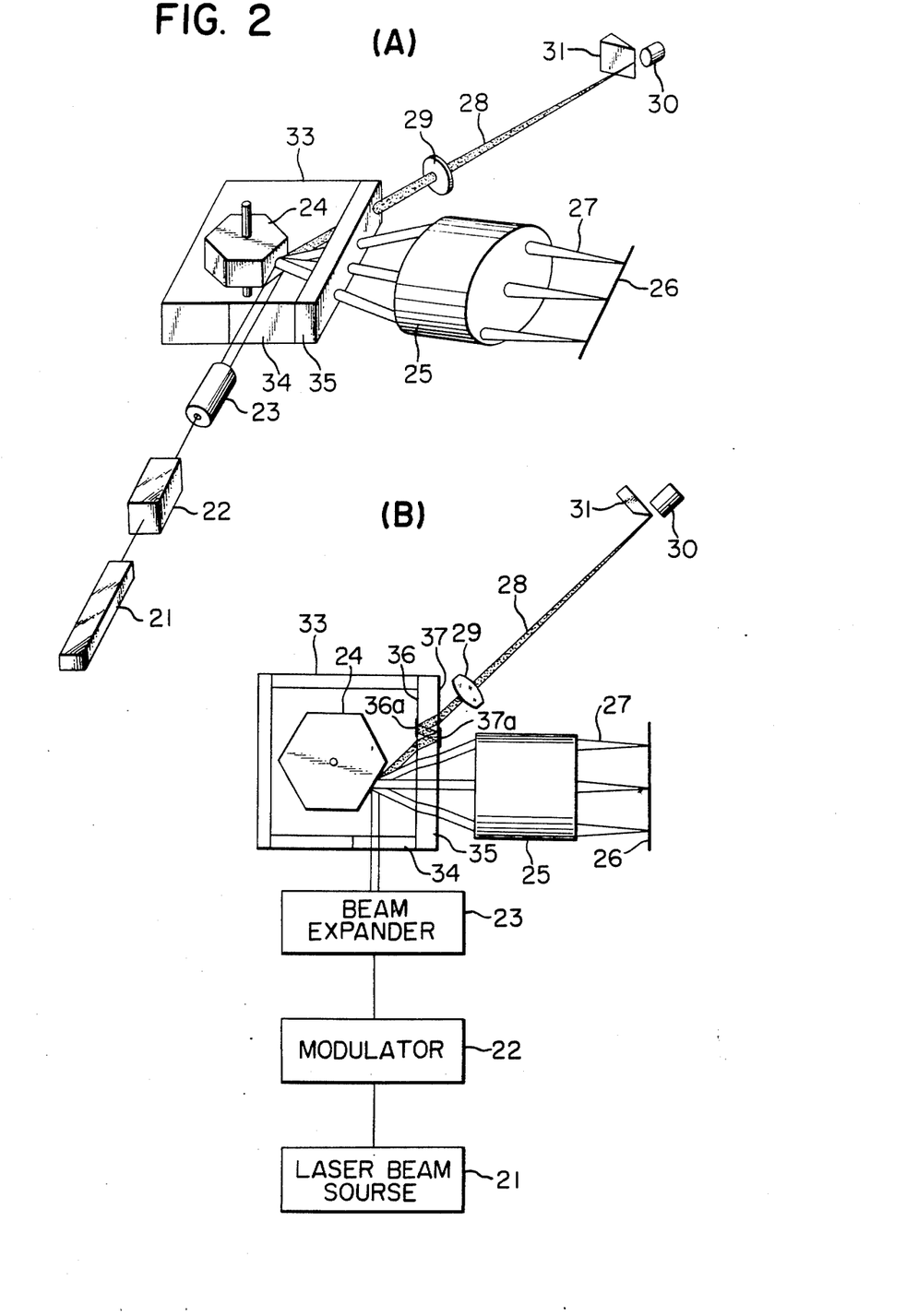

FIG. 2 shows one preferred embodiment of the scanning optical system according to the invention, and FIG. 2A is a perspective view thereof and FIG. 2B is a plan view of the same. Referring to FIGS. 2A and 2B, reference numeral 21 designates a laser beam source. A beam emitted from the source 21 passes through a modulator 22 which modulates the beam in accordance with a signal coming from a computer or the like, and thereafter the beam is expanded in respect to the diameter of the beam pencil by a beam expander 23. The expanded beam is impinged upon a rotary polygonal mirror 24 through the entrance window 34 of a polygon box 33 enclosing the polygonal mirror 24. The polygon box 33 protects other neigboring devices and members against damage when the rotary polygonal mirror is broken. The polygonal mirror reflects the beam through the exit window 35 of the polygon box to a focusing lens 25 which focuses the beam on a scanning plane 26. Each of the entrance- and exit windows 34 and 35 of the polygon box 33 is composed of a glass block so that the beam may pass through it. The exit window 35 serves also as a member for taking-up an information beam according to the invention and it has parallel surfaces 36 and 37. The surface 36 has a reflecting surface portion 36a and the surface 37 has a reflecting surface portion 37a so that the information beam 28 may come out from the exit window after it has been reflected by the reflecting surfaces 36a and 37a. If the information beam 28 incident to the reflecting surface 37a is completely divided from the effective recording or indicating beam 27, then the reflecting surface portion 37a is formed as a total reflection mirror. When the information beam and the effective beam are not separate from each other, the reflecting surface portion 37a is composed of a half-mirror. The reflections of the information beam 28 on such reflecting surfaces are necessary for the following reasons:

When an information beam such as the beam 28 must be obtained as a synchronizing signal for commencement of every scanning over the scanning plane by the scanning beam, an accurate synchronization is achieved by using a beam that is separate from a recording or indicating beam such as the effective beam 27 and that has an angle of field close to that of the effective beam.

By using such an information beam, synchronization error can be minimized. The reflections of the beam 28 as mentioned above result in an information beam that is completely separate from the corresponding effective beam and also prevents the information beam from being distorted by any object such as a metal frame supporting the focusing lens 25. This is the same as to other embodiments. The information beam 28 reflected in this manner and egressed from the exit window 35 is directed to an information beam focusing lens 29 having a focal length longer than that of the focusing lens 25 for the effective beam. The focused information beam is introduced into a light receiving element 30 through a knife edge 31 which is deflected with the rotation of the polygonal mirror 24. As described above, the information beam focusing lens 29 has a relatively longer focal length. This is because vibration of the light receiving element including the knife edge 31 as well as inaccuracy in mounting the knife edge may cause adverse effects on the detection of the information beam. A focusing lens having a longer focal length can diminish the adverse effects. The reason why it diminishes such adverse effects will be explained hereinafter referring to FIG. 3.

Figure 3:
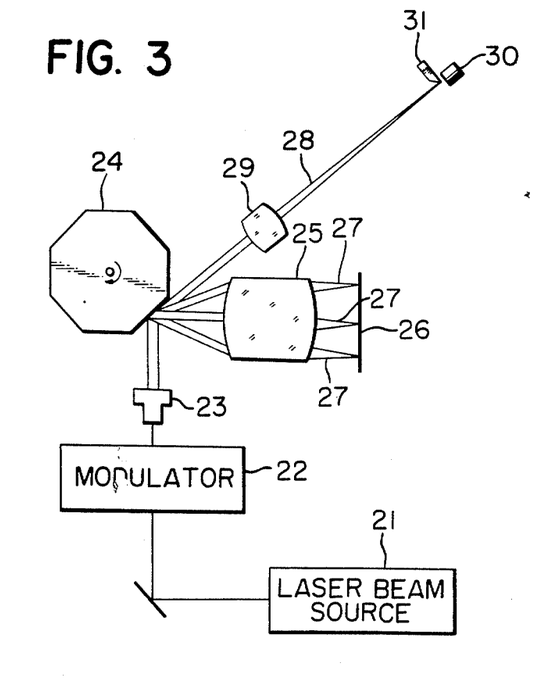
FIG. 3 is a schematic illustration of the scanning optical system showing, in particular, its information beam focusing optical system.

In the optical system shown in FIG. 3, the information beam other than the effective beam 27 is focused on the light receiving element 30 by the information beam focusing lens 29 the focal length of which is longer than that of the scanning beam focusing lens 25. Defining fr as the focal length of the information beam focusing lens 29 and f as that of the scanning beam focusing lens 25, the size of image on the surface of the light receiving element 30 will correspond to that of fr/f times the size of image on the scanning plane 26. Therefore, so long as the formula fr > f is satisfied, the image on the light receiving element will be enlarged relative to that on the scanning plane. Then, the spot diameter given by the focusing lens 29 will become fr/f times larger than that given by the focusing lens 25 owing to refraction, provided that there is no aberration in the former lens 29. Accordingly, on the light receiving element 30 there appears such a focused image as obtained by multiplying that on the scanning plane 26 by fr/f. Therefore, it becomes easy to set and position the knife edge 31 and the element 30 accurately. Also, the timing error in detection of the information beam due to relative vibration between the two members will be minimized. The enlarged spot diameter on the light receiving element 30 also has an effect in equalizing the nonuniformity of the light receiving element so as to produce virtually no timing error in the detection.

Figure 4:
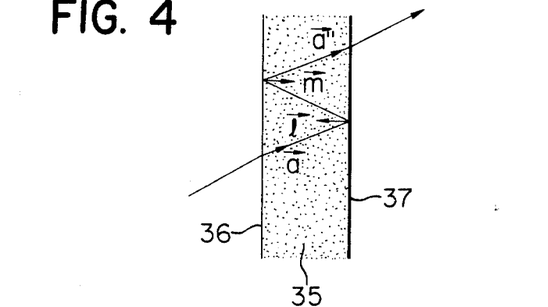
FIG. 4 shows the information beam passing through the first type of information beam taking-up member.

As to the case where the information beam taking-up member 35 is tilted relative to its normal position due to vibration, explanation will be made referring to FIG. 4 in which $\vec{a}$ is a vector of the beam incident on the surface 37 through the surface 36 of the member 35, $\vec{l}$ is a unit vector representing a surface normal on the surface 37, $\vec{m}$ is a unit vector representing a surface normal on the surface 36 and $\vec{a}''$ is a vector of the beam reflected by the surface 37 and then by the surface 36. Assumed that $\vec{a} = (a_1, a_2, a_3)$, $\vec{l} = (l_1, l_2, l_3)$, $\vec{m} = (m_1, m_2, m_3)$ and $\vec{a}'' = (a''_1, a''_2, a''_3)$, then the following equation is given:

$$\vec{a}'' = \vec{a} - 2\vec{l}(\sum_{i=1}^{3} a_i l_i) - 2\vec{m}(\sum_{i=1}^{3} a_i m_i) + \quad (1)$$

-continued $$4\vec{m} \left( \sum_{i=1}^{3} a_i l_i \right) \left( \sum_{i=1}^{3} l_j m_j \right)$$

Since the surfaces 36 and 37 are parallel with each other and $\vec{l} = -\vec{m}$, the equation (1) can be simplified as follows:

$$\vec{a}'' = \vec{a} \qquad (2)$$

Therefore, it will be understood that the direction of the beam coming out the surface 37 after reflection on the surface 36 is always the same as that of the beam coming in the member 35 irrespective of directional position of the surface 36. This means that the information beam can not be subjected to any angular variation by possible vibrational displacement of the information beam taking-up member so long as the two surfaces of the said member are kept parallel with each other. For this reason, the position at which an image is focused by the information beam focusing lens 29 is fixed and, therefore, it is assured that there is produced no error in taking-up the information beam despite vibration of the information beam taking-up member.

Figure 5:
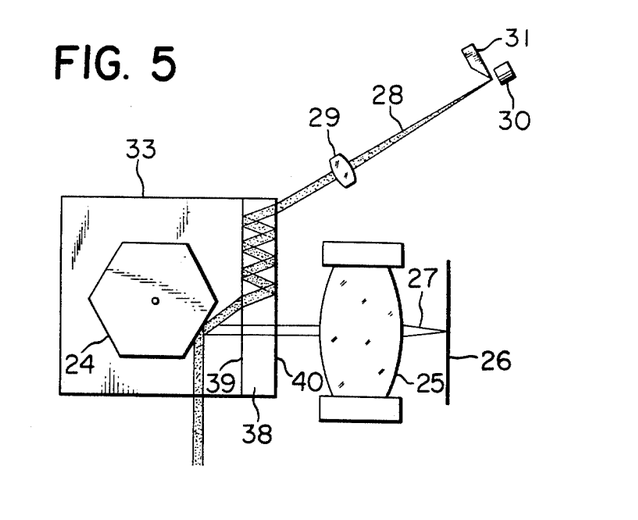
FIG. 5 is a schematic view of the optical system showing another embodiment using the first type of information beam taking-up member.

FIG. 5 shows another embodiment of the present invention where also the first type of member as mentioned above is used for taking-up the information beam. In this embodiment, the information beam focusing lens 29 is disposed spaced from the scanning beam focusing lens 25. The member 38 has two parallel surfaces 39 and 40 by which the beam is reflected an even number of time. The first type of information beam taking-up member illustrated in FIGS. 2 and 5 is composed of a glass member that constitutes the exit window of the polygon box. However, if no polygon box is used, the information member taking-up beam may be formed and mounted as a single unit member.

Figure 6:
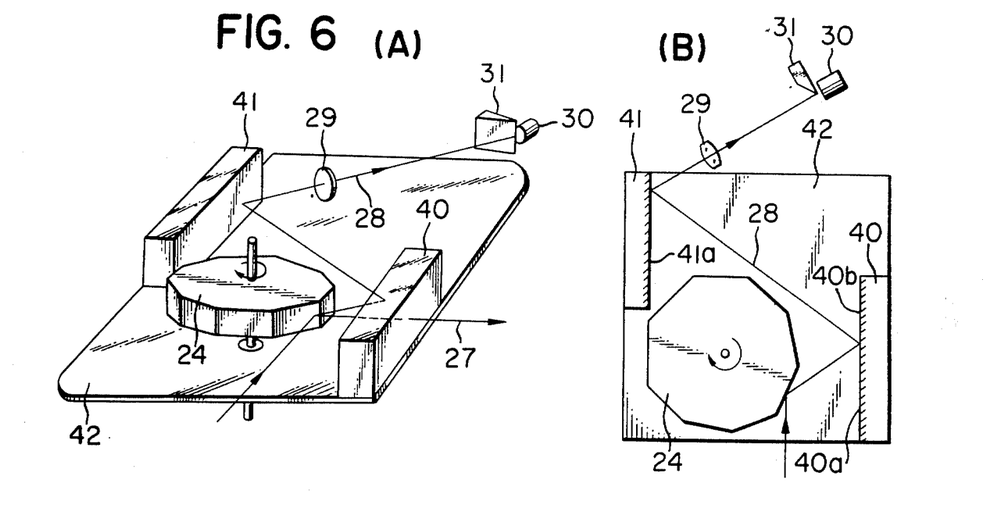
FIG. 6A is a perspective view of the optical system a showing further embodiment using the first type of information beam taking-up member and FIG. 6B is a plan of the same.

In the modified embodiment illustrated in FIGS. 6A and 6B, the information beam taking-up member which has the same characteristic as that of the above described first type of member, comprises two blocks of glass 40 and 41 fixedly mounted on a base plate 42. The surface 40a of the glass block 40 and the surface 41a of the glass block 41 opposed to the surface 40a are disposed parallel with each other. To take up the information beam 28, a portion of the surface 40a is formed as reflecting surface portion 40b. The beam 28 reflected by the reflecting surface portion 40b is again reflected by the reflecting surface 41a so as to direct the beam to the information beam focusing lens 29. On the other side, the effective beam 27 passes through the glass block 40 and comes into a focusing lens (not shown). In FIGS. 6A and 6B, both of the information and effective beams are represented only by the principal ray respectively. When the base plate 42 vibrates, the information beam taking-up member (40, 41) will vibrates simultaneously and in the same manner. Therefore, the two surfaces 40a and 41a are always kept parallel with each other, which allows to direct the information beam in a definite direction all the time.

Figure 7:
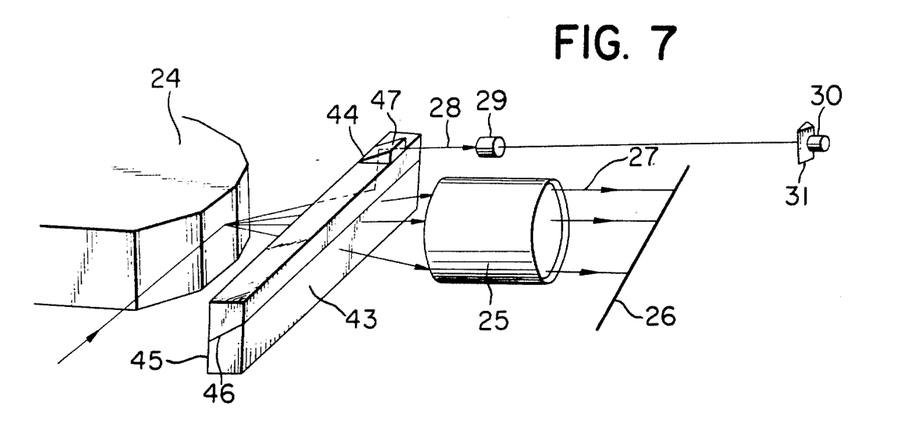
FIG. 7 is a partial schematic view of the optical system showing a still further embodiment of the invention using the first type of information beam taking-up member.

FIG. 7 shows another modification using the first type of information beam taking-up member. In this embodiment, the information beam taking-up member 45 comprises a rectangular parallelopipedon glass block 43, a small glass block 44 fixed to the block 43 in the shape of triangular prism and a half mirror surface 46 tilted disposed within the glass block 43. One surface of the small glass block 44 is processed to provide a reflecting surface 47 that is parallel with the half mirror surface 46. In this embodiment, the information beam 28 is reflected upwards by the half mirror surface 46 and then reflected by the reflecting surface 47 to come out from the member 45 toward the information beam focusing lens 29. On the other side, the effective beam 27 passes through the half mirror surface 43 and then egresses from the member 45 toward the focusing lens 25. When the information beam and the effective beam are completely divided from each other, the reflecting surface 46 may be formed to provide a total reflection surface only for the portion at which the information beam is taken up and a mere glass block for the portion through which the effective beam passes.

It will be noted that, in all the embodiments described above, the effective recording or indicating beam passes through the information beam taking-up member. These embodiments are particularly suitable for the scanning optical system in which the information beam taking-up member also served as the exit window of the polygon box. However, as already mentioned above, the information beam taking-up member can be formed and mounted as a specific single unit member. In such a case, the member may be provided only at the position where the necessary information beam has to be taken up while directing the effective beam from the beam deflecting device directly to the scanning beam focusing lens. This applies also to other embodiments described hereinafter.

Now, referring to FIG. 8, one preferred embodiment using the second type of information beam taking-up member will be described.

Figure 8:
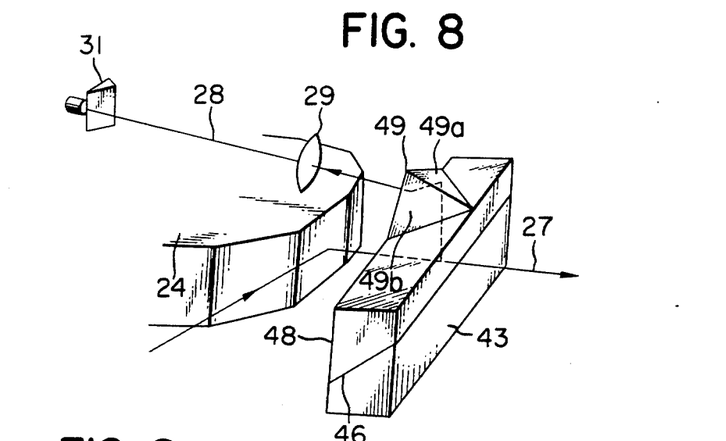
FIGS. 8 and 9 schematically show two embodiments of the invention using the second type of information beam taking-up member.

The information beam taking-up member 48 shown in FIG. 8 comprises a rectangular parallelopipedon glass block 43 containing a half mirror surface 46 like the glass block 43 in FIG. 7 embodiment and a small glass block 49 fixedly attached to the glass block 43. The small glass block has two reflecting surfaces 49a and 49b, and the half mirror surface 46. These surfaces cross at right angles to each other so as to form a so-called corner cube. The information beam has experienced reflections on the three surfaces 46, 49a and 49b before it enters the information beam focusing lens 29. The direction in which the information beam runs out from the member is opposite to the direction of incidence of the beam on the member. The direction is always fixed irrespective of possible vibration of the member 48.

Figure 9:
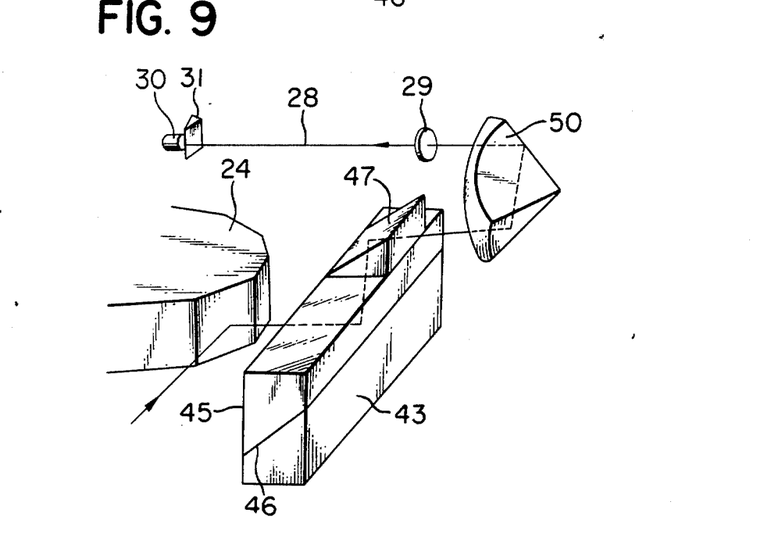

In the modification of the second type of information beam taking-up member shown in FIG. 9, the taking-up member comprises two separate parts i.e. a glass block part 45 that is the same as the information beam taking-up member 45 of FIG. 7 embodiment and a corner cube part 50. The information beam 28, after reflected by the half mirror surface 46 and the reflecting surface 47 of the member 45, comes out from the member in the same direction as that of incidence to it. Thereafter the beam 28 runs into the corner cube 50 which deflects the beam in the exact opposite direction relative to its incidence direction so as to direct it to the information beam focusing lens 29. Even when the member 45 and the corner cube 50 are subjected to vibration, it does not affect the exit direction of the information beam 28.

Figure 10A:
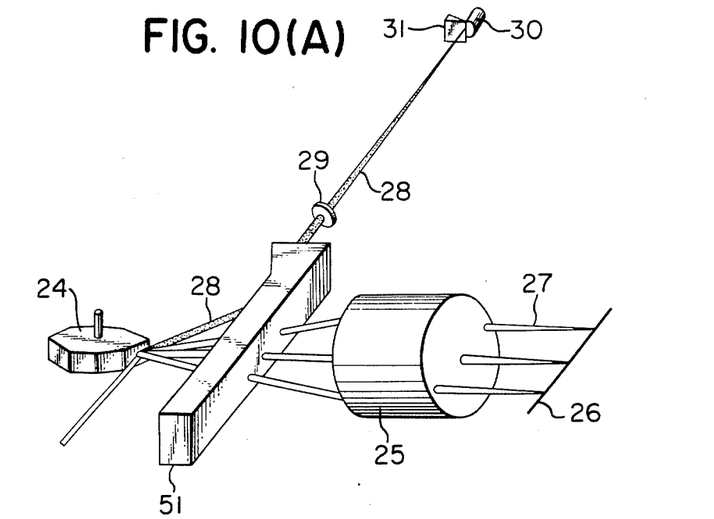
FIG. 10A is a partial schematic view thereof and FIG. 10B is a plan view of the same.
Figure 10B:
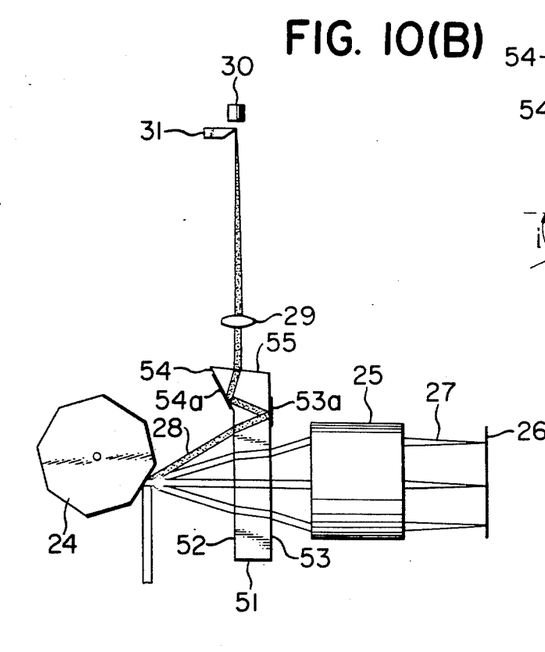

One embodiment using the third type of information beam taking-up member is illustrated in FIGS. 10A and 10B. In this embodiment, the information beam taking-up member 51 is designed to reflect the information beam an even number of times in the member and then direct it to the information beam focusing lens 29 which focuses the beam on the light receiving element 30. To this end, the member 51 has two opposed surfaces 52 and 53 which are parallel with each other, one additional surface 54 which is contiguous to the surface 52, but not parallel with the opposed surface 53. The information beam 28 egresses through the end surface 55 of the member 51. The recording or indicating effective beam 27 passes through the member 51 and comes into the focusing lens 25 by which the beam is focused on the scanning plane 26. To take up the information beam, there are provided reflecting surface portions 53a and 54a on the two parallel surfaces 53 and 54. The information beam taking-up member 51 differs from the member 35 of FIG. 2 embodiment in the provision of the addition surface 54 which allows to take up the information beam in the desired direction.

Figure 11:
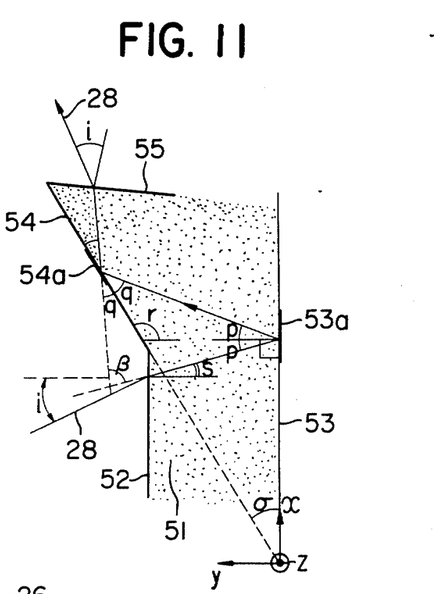
FIG. 11 shows the information beam passing through the third type of member.

The member 51 may be tilted for any reason such as vibration. Now, we would like to consider such a case referring to FIG. 11. FIG. 11 is a partially enlarged view of the member 51 which has a refractive index of N. The beam incident upon the reflecting surface 53a and the beam reflected upon the reflecting surface 54a form an angle of $\beta$. To know the angle $\beta$, a x-y-z system of coordinate is taken as shown in FIG. 11. Then the angle $\beta$ is given as follows:

$$\begin{aligned} \beta &= r - (p + q) \\ &= 90° + \sigma - (p + q) \\ &= 90° + \sigma - (\frac{180° - \beta}{2}) \\ &\quad (\because 2p + 2q + \beta = 180°) \end{aligned}$$

wherein,
 $\sigma$ is the wedge angle formed by the reflecting surfaces 53a and 54a,
 p is the angle of incidence of the beam on the surface 53a,
 q is the angle of incidence of the beam on the surface 54a and
 r is the angle formed by the surface 54 and a surface normal to the surface 53.

Therefore, $\beta$ is obtained as $\beta = 2\sigma$. This means that the angle $\beta$ is independent of the incident angle of the beam on the reflecting surface 53a. Furthermore, for the incidence of the beam from the air to the member, the following equation is given:

$$\sin i / \sin S = N$$

wherein,
 i is the incident angle of the beam on the surface 52 and
 S is the angle of refraction.

The equation is also applicable for the exit of the beam from the member to the air.

Therefore, whenever the surface 55 is so adjusted that the angle of incidence of the information beam 28 upon the surface 55 may become S, the angle of exit of the beam from the surface 55 becomes i. Thus by positioning the surface 55 in this manner, the adverse effect of refraction can be obviated and the angle formed by the beam incident upon the information beam taking-up member and the beam leaving the same member can be maintained at $\beta$ all the time. In other words, the direction in which the beam is thrown from the information beam taking-up member can be remained unchanged relative to the rotation of z-axis of the member. For rotational movement other than the rotation of z-axis, the exit angle of the beam is usually changed. However, the angular change in the direction of scanning plane will be negligibly small so long as the vibration angle is small.

Figure 12:
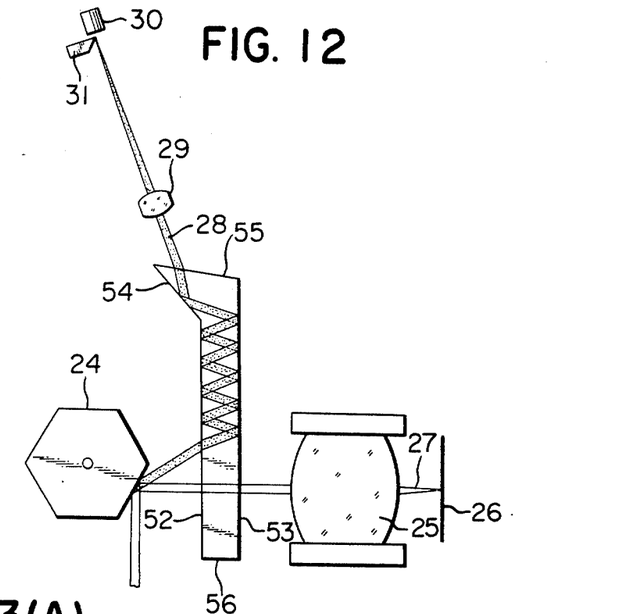
FIGS. 12 through 14 show further embodiments of the invention using the third type of information beam taking-up member.

FIG. 12 shows one modification of the third type of information beam taking-up member. The member 56 is essentially the same as the member 51 of FIG. 10 embodiment. But the opposed parallel surfaces 52 and 53 of the member 56 are longer than those of the member 51. The information beam 28 is reflected in the member many times in even number larger than four and thereafter it is thrown out toward the information beam focusing lens 29.

Figures 13A, 13B:
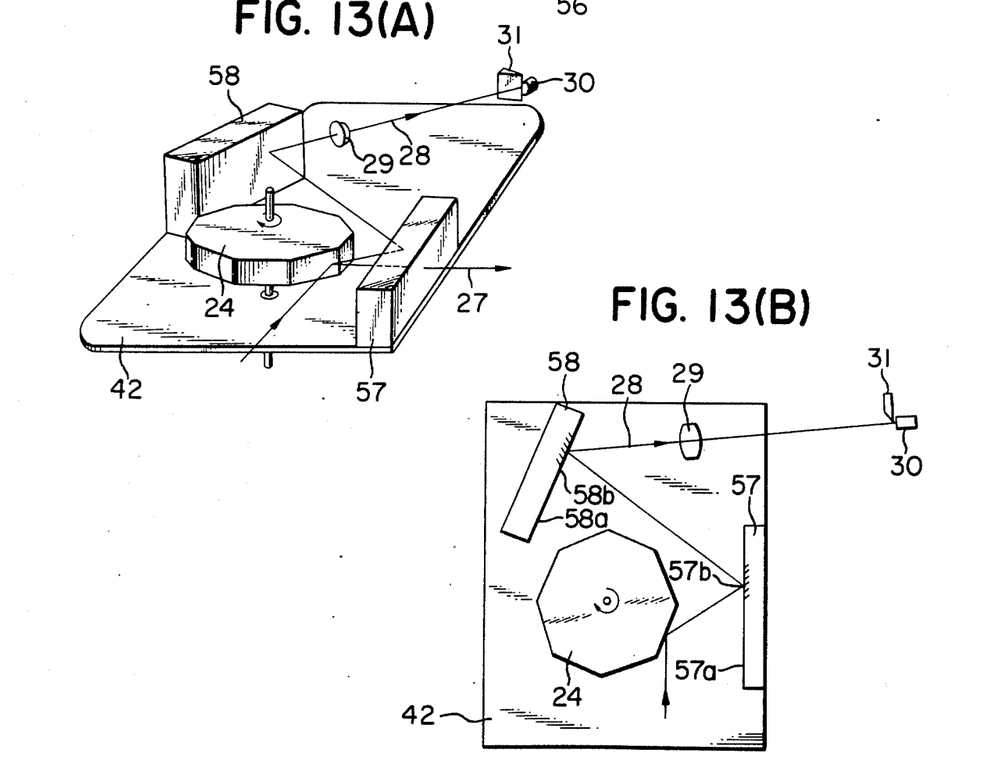

Another modification of the third type of information beam taking-up member is illustrated in FIGS. 13A and 13B. In the figures, the beam is represented by its principal ray. The arrangement of the member of FIGS. 13A and 13B is almost the same as that shown in FIGS. 6A and 6B. Only the difference between them is found in that the surface 57a of the glass block 57 and the surface 58a of the glass block 58 are not parallel with each other. The information beam 28 is reflected by the reflecting surfaces 57b and 58b provided on the glass blocks 57 and 58 respectively and directed to the information beam focusing lens 29 along the desired direction of path. The glass blocks 57 and 58 which constitute an information beam taking-up member, are fixed on the base plate 42 and therefore they are subjected to the same vibration. As a result, the vibration does not affect on the exit direction of the information beam 28 as already mentioned above.

Figure 14:
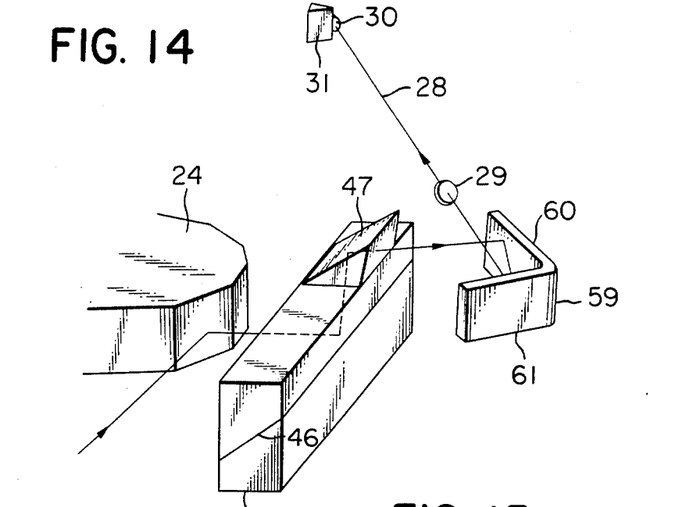

FIG. 14 shows further modification of the third type of information beam taking-up member. The member is composed of two separate parts. One of the parts is the member 45 which is substantially the same as the member illustrated in FIG. 7. The other is the member 59 comprising two reflecting surfaces 60 and 61 which form a wedge angle relative to the scanning plane (not shown). The information beam 28 is reflected twice in the member 45 firstly by the half mirror surface 46 and secondly by the reflecting surface 47. After reflected in the manner, the beam 28 leaves the member 45 in the same direction as that of incidence to the member and impinges upon the member 59 which direct the beam to the information beam focusing lens 29 after its reflections on the surfaces 60 and 61.

The two reflecting surfaces 60 and 61 of the member 59 may be united together. Also, the member 59 may be composed of a prism instead of two reflection mirrors.

Figure 15:
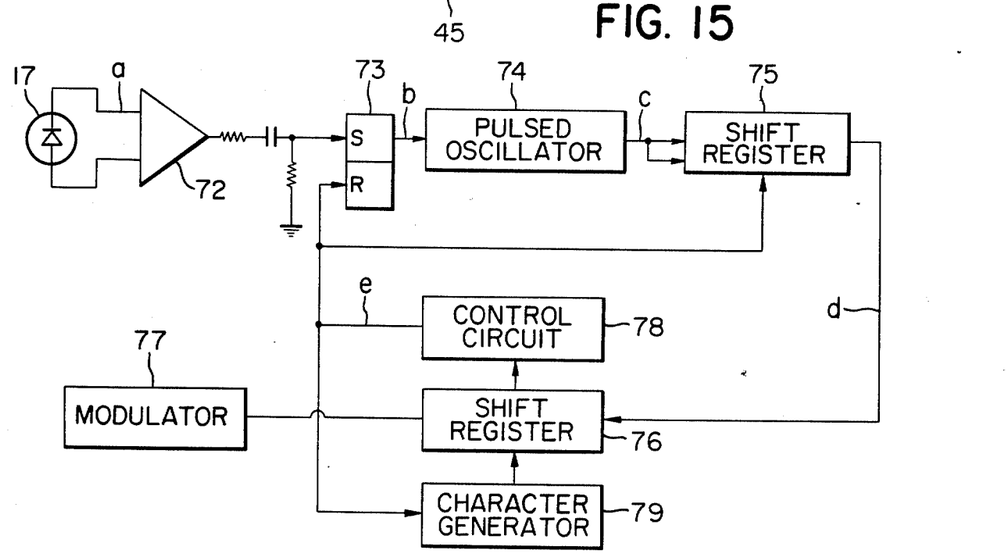
FIG. 15 is a block diagram showing one example of the control circuit for controlling the scanning beam using the information beam.
Figure 16:
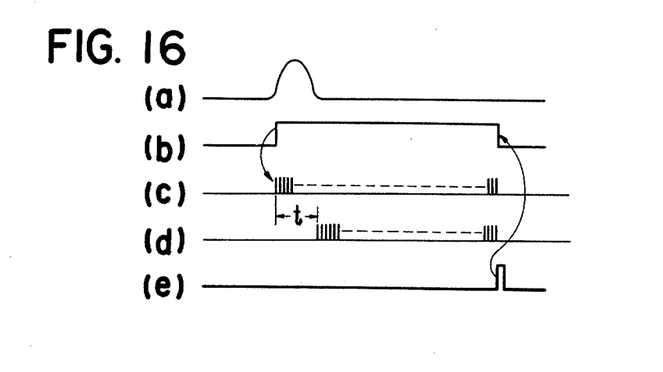
FIG. 16 is a time chart of the control circuit shown in FIG. 15.

FIG. 15 shows one embodiment of the control system for controlling the scanning beam emitted from the beam source by using the output signal of the information beam detected by the light receiving element 30. FIG. 16 is a time chart of the circuit shown in FIG. 16. Referring to FIGS. 15 and 16, an output signal a coming from a light receiving element 71 such as a pin photodiode is amplified by an amplifying circuit 72, differentiated and given to the set terminal of a flip-flop circuit 73. The output signal b of the flip-flop circuit 73 is put into a pulsed oscillator 74 to generate a pulse signal c. The pulse interval of the pulse signal c is determined by various factors such as the velocity of scanning beam over the scanning plane and the amount of signal given to a modulator during every horizontal scanning time. The pulse signal c is given to the serial input terminal and the clock input terminal of a shift register 75. Therefore, the shift register 75 counts the number of the pulse from the pulse oscillator. Whenver the shift register has reached its full capacity, it generates a pulse signal d similar to the input signal to the register. The pulse signal d is given to the clock input terminal of a second shift register 76. On account of the capacity of the first shift register 75, the clock pulse introduced in the second shift register 76 is delayed by the time of t. The time t is a time during which the scanning beam passed through the photo element 71 can reach the position at which scanning commences for writing or reading on the scanning plane. In the shift register 76, there are stored signals necessary for writing on the scanning plane and the stored signals are successively sent out to a modulator 77 for controlling the scanning beam. The reference numeral 78 designates a control circuit which generates a pulse signal e whenever all the signals stored in the shift register 76 have been sent out to the modulator 77. This pulse signal e is introduced to the reset terminal of the above mentioned flip-flop 73 so as to stop the operation of the pulsed oscillator and to give an input to the reset terminal of the shift register 75. Also, the pulse signal e gives an input to a character generator 79 so that the information stored in the character generator 79 may be sent over to the shift register 76. In this manner of operation, one cycle of horizontal scanning on the scanning plane is completed.

From the foregoing, it will be understood that the present invention the essential feature of which resides in the use of an information beam taking-up member which allows decrease in the angle of field of the focusing lens compared with that of the conventional system and, therefore, it is allowed to miniaturize the necessary lens and beam deflecting device. The conventional system has to take up the information beam via a focusing lens, which necessitates a comperatively large focusing lens as well as a large angle of field.

Further, according to the invention using the information beam taking-up member, it is allowed to reduce the distance between the beam deflecting device and the focusing lens to the utmost extent by using as the taking-up member, a light transmissive glass member enclosing the beam deflecting device for protection. This also serves to further reduce the size of the necessary focusing lens.

Since the information beam taking-up member can take up the information beam at the vicinity of the effective beam on the essential scanning area, i.e. those area for which scanning should be done by the light beam, it is also possible to obtain an accurate synchronizing signal particularly useful for the system in which a timing signal is required for the scanning beam to commence scanning the essential scanning area.

When two separate focusing lenses are used for focusing the information beam and the scanning beam respectively and the information beam focusing lens has a longer focal length than that of the focusing lens for scanning according to the invention, then adverse effects on scanning caused by the vibration of the light receiving element including a knife edge for detecting the information beam can be minimized and also a larger allowance of accuracy in mounting the knife edge becomes permissible.

While the invention has been particularly shown and described with reference to preferred embodiments thereof, it will be understood by those skilled in the art that the foregoing and other changes in form and details can be made therein without departing from the spirit and scope of the invention.

What we claim is:

1. A scanning optical system comprising:
   a light source emitting a beam used for scanning;
   a deflecting device for deflecting the beam emitted from said light source to scan in a predetermined direction;
   a first focusing lens for focusing the deflected beam from said deflecting device onto a scanning plane;
   an optical system disposed between said first focusing lens and said deflecting device for reflecting a portion of the beam from said deflecting device a plurality of times within the optical system so as to take up said portion of the beam as an information beam; and
   a second focusing lens for focusing the information beam.

2. A scanning optical system as claimed in claim 1 wherein said second focusing lens has a focal length longer than that of the first one.

3. A scanning optical system as claimed in claim 2, wherein said optical system for taking up the information beam maintains a constant directional relationship between the direction of incidence of the beam on said optical system and the exit direction of the information beam from the same.

4. A scanning optical system as claimed in claim 3 wherein said optical system comprises a reflecting system including two parallel opposed surfaces for reflecting the information beam an even number of times therewithin so that the exit direction of the information beam from said optical system is the same as the incident direction of the beam on it.

5. A scanning optical system as claimed in claim 3 wherein said optical system includes a corner cube so arranged that the information beam is reflected a plurality and an odd number of times within said optical system and wherein the exit direction of the information beam from said optical system is opposite to the incident direction of the beam on it.

6. A scanning optical system as claimed in claim 3 wherein said optical system includes two surfaces which are normal to a plane containing the beam incident on said optical system, but not parallel to each other and wherein said optical system is so arranged that the information beam is emitted from said optical system at least once through a reflection system formed by said two surfaces while directing the exit direction of the information beam to the desired direction in the plane containing the beam incident on said optical system or a plane parallel to said plane.

7. A scanning optical system as claimed in claim 1 wherein said optical system maintains a constant directional relationship between the direction of incidence of the beam on said optical system and the exit direction of the information beam from it.

8. A scanning optical system as claimed in claim 7 wherein said optical system comprises a reflecting system including two parallel opposed surfaces so arranged that the information beam is reflected an even number of times within said reflecting system and wherein the exit direction of the information beam from said optical system is the same as the incident direction of the beam on it.

9. A scanning optical system as claimed in claim 7 wherein said optical system includes a corner cube so arranged that the information beam is reflected a plurality and an odd number of times within said optical system and wherein the exit direction of the information beam from said optical system is opposite to the incident direction of the beam on it.

10. A scanning optical system as claimed in claim 7 wherein said optical system includes two surfaces which are normal to a plane containing the beam incident on said optical system, but not parallel to each other and said optical system is so arranged that the information beam is emitted from said optical system at least once through a relfection system formed by said two surfaces while directing the exit direction of the information beam to the desired direction in the plane containing the beam incident on said taking-up optical system or a plane parallel with said plane.

11. A scanning optical system comprising:

a light source emitting a beam used for scanning;

a deflecting device for deflecting the beam from said light source to scan in a predetermined direction, said deflecting device including an optical system for detecting a part of the beam as an information beam;

a first focusing lens for focusing the deflected beam from said deflecting device on a scanning plane; and a second focusing lens having a focal length longer than that of said first focusing lens and disposed to focus the information beam from said deflecting device on a photo-detecting member.

* * * * *

UNITED STATES PATENT OFFICE
CERTIFICATE OF CORRECTION

Patent No. 4,130,339            Dated December 19, 1978

Inventor(s)     NAOTO KAWAMURA, ET AL

It is certified that error appears in the above-identified patent and that said Letters Patent are hereby corrected as shown below:

Column 1, line 48, "polygone" should read --polygonal--;

Column 4, line 21, after "which" insert --are--;

Column 4, line 65, after "system" delete "a";

Column 4, line 66, after "showing" insert --a--;

Column 7, line 32, "time" should read --times--.

Signed and Sealed this

Twenty-ninth Day of May 1979

[SEAL]

Attest:

RUTH C. MASON
Attesting Officer

DONALD W. BANNER
Commissioner of Patents and Trademarks